United States Patent [19]

Martens et al.

[11] Patent Number: 4,552,099

[45] Date of Patent: Nov. 12, 1985

[54] ANTICIPATORY BOILER FEEDPUMP SUCTION HEAD CONTROLLER SYSTEM

[75] Inventors: Alan Martens, Berwyn; Milton M. Hobbs, Marple Township, Delaware County; Bennie E. Snow, West Chester, all of Pa.

[73] Assignee: Westinghouse Electric Corp., Pittsburgh, Pa.

[21] Appl. No.: 664,640

[22] Filed: Oct. 25, 1984

[51] Int. Cl.⁴ .............................. F22D 5/26
[52] U.S. Cl. ............... 122/451.1; 122/406 S; 122/451 R; 122/451 S
[58] Field of Search ............ 122/451 R, 451 S, 451.1, 122/406 S, 406 ST

[56] References Cited

U.S. PATENT DOCUMENTS

| | | | |
|---|---|---|---|
| 3,166,910 | 1/1965 | Brunner | 122/451 S |
| 4,207,842 | 6/1980 | Kehlhofer | 122/406 S |
| 4,290,390 | 9/1981 | Juzi | 122/451 S X |
| 4,497,283 | 2/1985 | La Spisa et al. | 122/451.1 |

Primary Examiner—Edward G. Favors
Attorney, Agent, or Firm—R. G. Brodahl

[57] ABSTRACT

Boiler feedpump net positive suction head (NPSH) control is performed in a heat recovery steam generator including a deaerator inserted between steam turbine condensate and steam boiler. To this effect apparatus is provided responsive to temperature at the output of the deaerator, to fluid flow therefrom, and to temperature at the input of the boiler feedpump for providing a signal representative of the anticipated suction head pressure, and the NPSH margin is derived by comparison with actual pressure to control the pegging valve, or other heat source control to the deaerator.

7 Claims, 6 Drawing Figures

ANTICIPATORY BOILER FEEDPUMP SUCTION HEAD CONTROLLER SYSTEM

BACKGROUND OF THE INVENTION

The invention relates to steam boiler operation in general, and more particularly to operation of the boiler feedpump circulating deaerated feedwater from the liquid phase of the deaerator to the heat exchangers contributing to the generation of superheated steam, for a steam turbine for instance.

The boiler feedpump stands directly in the hydraulic line behind the deaerator, e.g. where finely divided feedwater from the condenser experiences degassing in the vapor phase above the tank where degassed water accumulates.

The primary function of the deaerator is to remove non-condensible gases such as oxygen and carbon dioxide from the condenser feedwater. Secondary, it heats the feedwater to its saturation point, depending upon the operating pressure of the boiler unit. This is accomplished by utilizing as auxiliary energy sources the low pressure storage tank, the economizer, pegging steam from the high pressure steam drum and/or extraction steam from the steam turbine. Thirdly, the deaerator stores feedwater and returns condensate at boiling temperature to satisfy boiler demands. The heated and deaerated water, after it leaves the deaeration section, passes to the tank or storage section where it is blanketed by a steam cushion to retain its heat. The deaerator is state of the art. A reference can be found in "Planning Fundamentals of Thermal Power Plants"/F. S. Aschner - John Wiley 1978, pp. (29-132).

The operation of the deaerator has an incidence on the boiler feedpump which extracts feedwater from the storage tank of the deaerator and feeds it to the economizer. The boiler feedpump design and operation are described on pages 137–146 of the F. S. Aschner book. One general problem with a pump is to maintain at its input a minimum pressure on the suction branch thereof. Translated into a column of water, this requirement is called the "maximum suction head" of the pump, which is determined by the "net positive suction head" (NPSH) known as the gauge reading in meters at the pump section branch minus the vapor pressure in meters, $H_{vap}$, corresponding to the temperature of the liquid plus velocity head ($c^2/2$ g) at the pump suction. When boiling liquids are pumped from a closed vessel, the NPSH is the static liquid head in the vessel above the pump center line minus losses of head in the suction pipe (see in F. S. Aschner book page 141). The admissible suction head $H_s$ (in meters) is:

$$H_s \leq H_{bar} - H_{vap} - H_{frp} - H_{p,u} - (C^2/2 \text{ g}) - (\text{safety margin against cavitation}) \quad (1)$$

where $H_{bar}$ is the atmospheric pressure in meters of the liquid; $H_{frp}$ is the friction resistance of the suction pipe and $H_{pu}$ is the inlet resistance of the pump.

Cavitation is a mechanical wearing away of the metal surface of the pump caused by the liquid leaving the guiding surface, creating a vacuum liberating air and water and forming a bubble. The bubble collapses under the high pressure of the water and a very large local pressure on the entrapped air ensues, which hits the metal surface. Pitting, vibration and noise accompany such repeated occurrence of cavitation in the pump. Cavitation also adversely affects the performance of a pump. Critical to the generation of cavitation is the minimum pressure required, namely the net positive suction head as explained in "Design and Performance of Centrifugal and Axial Flow Pumps and Compressors" by Andre Kovats, Pergamon Press, 1964, pp. 69–74, or in "Pumps and Blowers" by A. J. Stepanoff, John Wiley & Sons, 1965, pp. 3–55. Stepanoff also considers the thermodynamics of boiler feedpumps on pages 104–110 of his book.

SUMMARY OF THE INVENTION

The present invention proposes to prevent cavitation from occurring in the boiler feedpump of a boiler system by monitoring the net positive suction head of the pump and by controlling the operating conditions in the deaerator associated with the boiler, so as to provide corrective and protective actions.

The invention comprises a suction head controller for the boiler feedpump circulating degassed feedwater from the deaerator of a boiler to the heat exchangers of the boiler.

The controller according to the present invention generates an anticipatory signal representative of the desired pressure in the suction head of the pump, and provided with such setpoint anticipatory control by reference to such setpoint signal in relation to actual pressure in the suction head. The anticipatory signal is derived from function generators which convert: one, the feedwater temperature into pressure of saturation, the other, water flow into net positive suction head (NPSH) for the pump. The sum of the anticipated net positive suction head and the pressure of saturation is, then, differentiated from the actual pressure in the suction head of the pump. It is this differential signal which is used to either add steam to the deaerator in order to increase pressure and compensate for a want at the pump location, or supply cold water to reduce pressure. In an extreme situation, protective action is taken by stopping the boiler. If necessary, starting of the pump will be inhibited.

DESCRIPTION OF THE PREFERRED EMBODIMENT

For the purpose of the description of the preferred embodiment of the invention, U.S. Pat. Nos. 3,955,358 and 3,965,675 of L. F. Martz et al. are hereby incorporated by reference.

Figure 1:
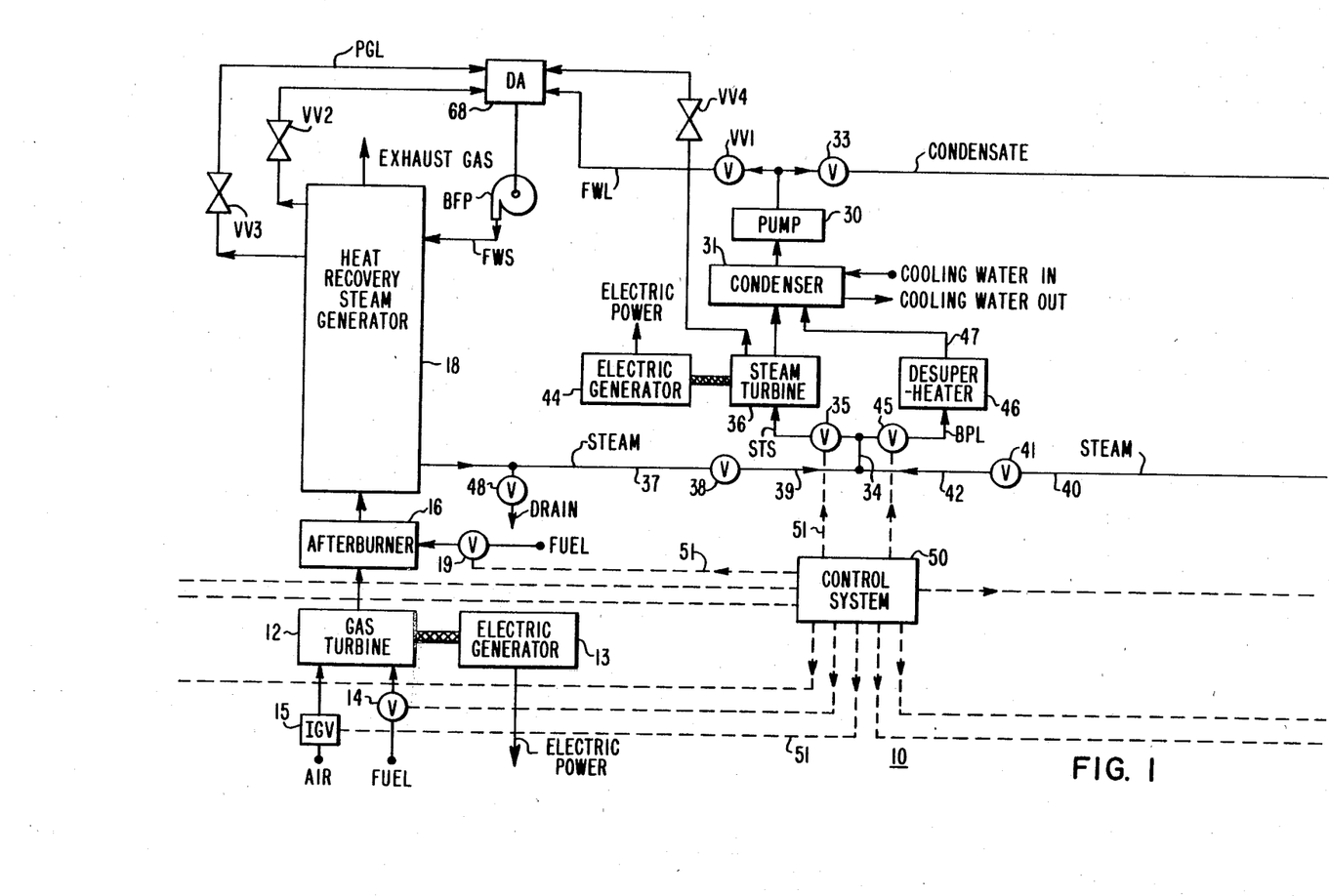
FIG. 1 is a block diagram of a combined-cycle boiler-steam turbine plant, to which the controller according to the invention can be added.

Referring to FIG. 1, there is shown a functional block diagram of a combined-cycle power generation plant including, typically, two gas turbines and heat recovery steam generators, only one gas turbine 12 with the associated electric generator 13 and one heat recovery steam generator (HRSG) 18 being shown for clarity and simplification. The gas turbine is coupled with an afterburner 16. The heated gas released from combustion is admitted to pass through the HRSG 18, then, to exhaust. Steam generated by HRSG 18 via line 37, valve 38, line 34, valve 35 and steam supply line STS is fed into the steam turbine 36 which is driving an electric generator 44 and the turbine is fluidly coupled to its condenser 31. An alternate route for the steam is a bypass by line BPL and bypass valve 45, to a desuperheater 46 going by line 47 to the condenser 31. All the valves, 14 for the fuel into the gas turbine, 19 for the fuel in the afterburner 16, 35 in the steam supply line STS and 45 in the bypass line BPL, are controlled by lines 51 from the control system 50 which, otherwise, also pertain to other control sequences in the plant operation, such as generation of power, of steam, start-up and stop, feedwater flow, etc., as generally known. See, for instance, the incorporated by reference U.S. Pat. Nos. 3,955,358 and 3,965,675 of L. F. Martz et al.

The deaerator DA, which is part of the heat recovery steam generator 18, (shown by block 68 in FIG. 1) normally receives condensate fluid pumped at 30 from the condenser 31 via feed line FWL into the deaerator. Degassed liquid accumulated in the storage tank of the deaerator (not shown) is circulated by a boiler feedpump BFP and supplied by line FWS to the economizer within HRSG 18, as generally known. The boiler feedpump has its suction head, SHD, turned toward the deaerator storage tank. Heated feedwater from the economizer (within HRSG 18) is fed into the vapor phase section of the deaerator 68, while saturated steam from the high pressure steam drum is recirculated in a fashion known as "pegging" through a valve VV3, via supply line PGL, into the vapor phase section of the deaerator 68. Within the turbine control system 50, or associated with it, control is provided onto valve VV2, onto valve VV3 and onto valve VV4, the latter controlling fluid flow for the extracted steam.

Figure 2:
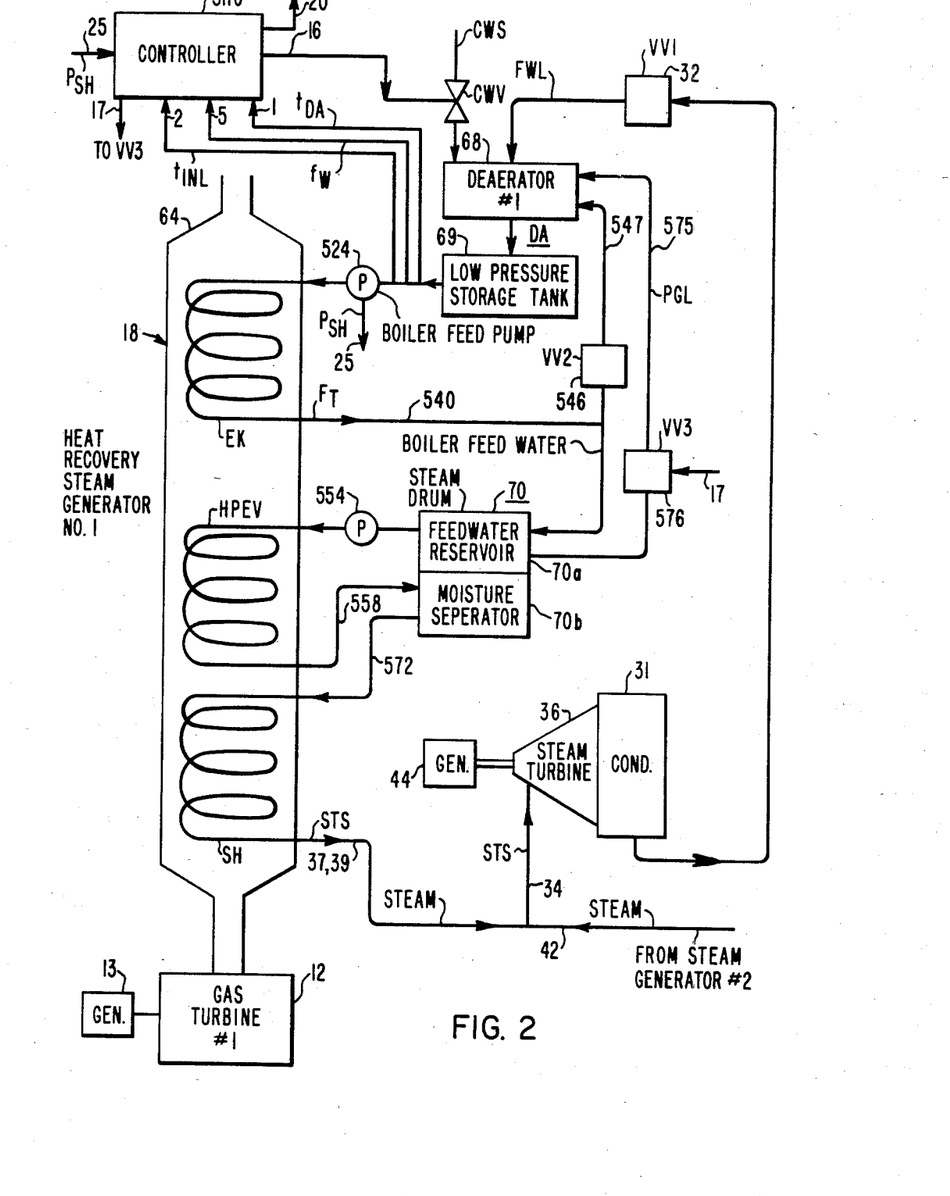
FIG. 2 is descriptive of the controller according to the invention inserted in circuit with the feedline from the deaerator to the boiler feedpump of an installation like in FIG. 1.

Referring to FIG. 2, the heat recovery steam generator 18 is shown to include an economizer EK (262 in the patents incorporated by reference), a high pressure evaporator HPEV (261 in the patents) and a superheater SH (260 in the patents). The deaerator is shown to include: a section 68 for the vapor phase where degassing takes effect and a low pressure storage tank 69 for the liquid phase in which condensed vapor accumulates as degassed water. The boiler feedpump 524 (BFP in FIG. 1) extracts feedwater from tank 69 and feeds it into the economizer EK. By line 540, boiler feedwater is derived from the economizer and after passing through valve (546, VV2) it enters, via line 547, into deaerator vapor section 68. A cold water supply CWS via controlled valve CWV supplies cold water to the vapor section 68 of the deaerator. By line 540 flow of boiler feedwater from the economizer is going to the saturated vapor portion 70a of the steam drum 70. The HPEV section receives saturated vapor from 70a, circulated by pump 554 into the tubing for heat exchange therein, and the vapor, entrained via line 558, is separated within the moisture separator section 70b of steam drum 70. From the steam drum, vapor goes by line 572 into the superheater SH (260 in the patents) where it becomes superheated steam.

At the outlet of tank 69, the temperature $t_{DA}$ of the degassed feedwater is measured and inputted via line 1 into the boiler feedpump suction head controller SHC according to the present invention. At the same time, an indication of temperature $t_{INL}$ at the inlet of boiler feedpump (BFP, 524) is derived by line 2 and inputted into controller SHC. Furthermore, a signal $f_W$ indicative of feedwater flow to the pump through the connecting pipe from the deaerator, is derived by line 5 and also inputted into controller SHC. As explained hereinafter, controller SHC uses data from lines 1, 2 and 5 to generate a signal anticipatory of the net positive suction head (NPSH) of the pump over and above suction pressure as a function of the total flow to the boiler feedpump. Controller SHC makes decisions for corrective and protective actions if the pump drops below the anticipated control point. Such actions are as follows:

(a) Steam is added to increase the vapor pressure above the liquid phase in the deaerator. To this effect, high, or intermediate, pressure from the steam in the HP drum can be used. There is also the possibility of using a feedwater heater above the low pressure drum LPD. As illustrated in FIG. 2, a control signal on line 17 from controller SHC is applied to the control valve PGV of the pegging derivation line PGL. The amount of steam added is made proportional to the error between actual pressure and anticipated pressure head detected within controller SHC. Thus, a ramping pressure setpoint is established by the controller for the pegging steam valve VV3 to increase deaerator pressure and boiler feedpump suction, when the NPSH margin becomes less than a minimum, typically 36 feet;

(b) If the error increases beyond the indication point for the preceding protective step, control is by line 16 on the cold water supply by valve CWV. Cold water is supplied to the deaerator so that a net increase of pressure is caused to occur due to the cooling effect of water on the steam above the column behind the boiler feedpump BFP;

(c) Should the inlet temperature sensed on line 2 fall despite either step (a) or step (b), then, controller SHC by line 6 will cause the aforementioned ramping pressure setpoint control to stop;

(d) Controller SHC also insures that there will be adequate inlet pressure to start up the pump from the STOP status. Should the required minimum inlet pressure be lacking, typically if NPSH is less than 4 feet, controller SHC by line 20 inhibits starting of the pump.

Figure 3A:
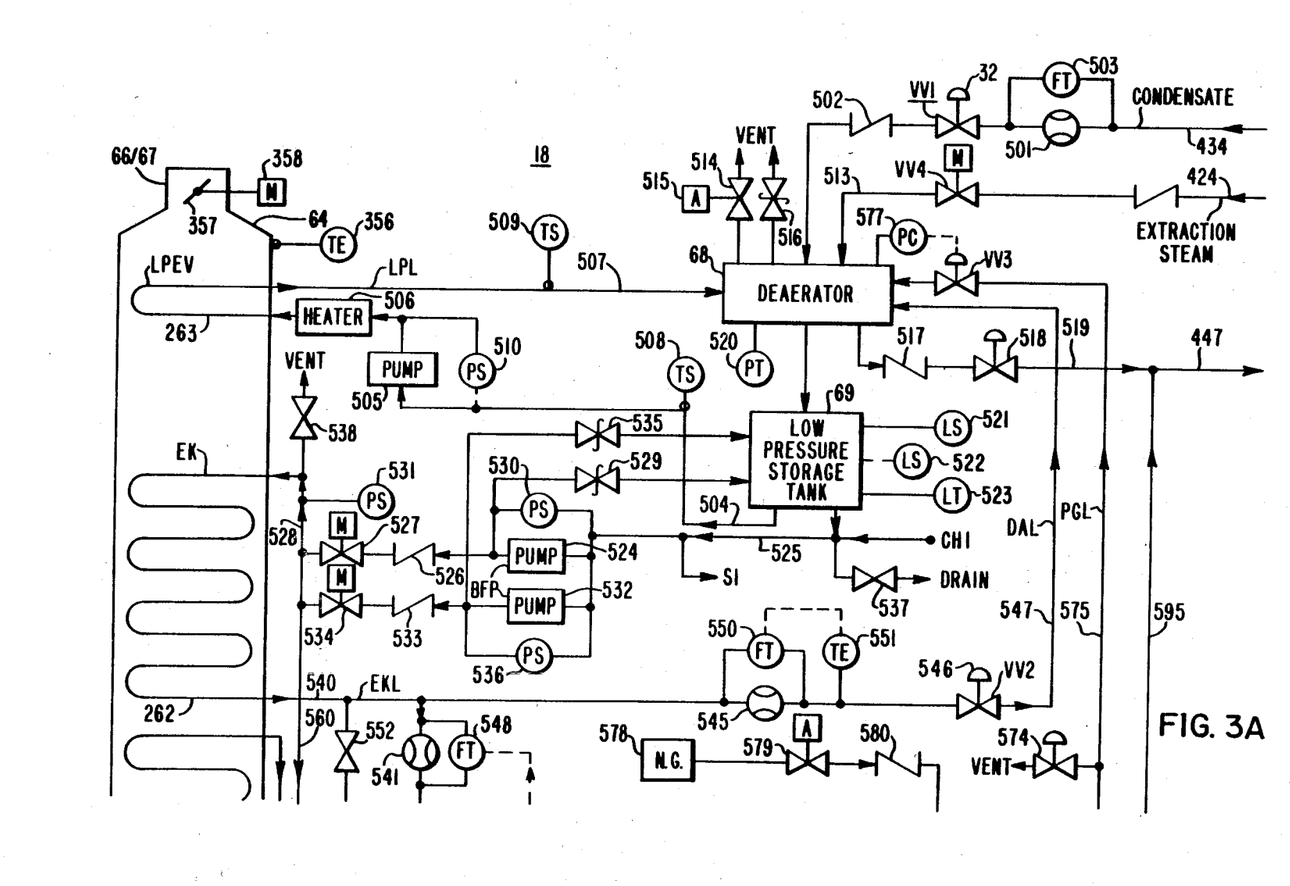
FIG. 3 illustrates the control elements associated with a boiler like the one of FIG. 2.
Figure 3B:
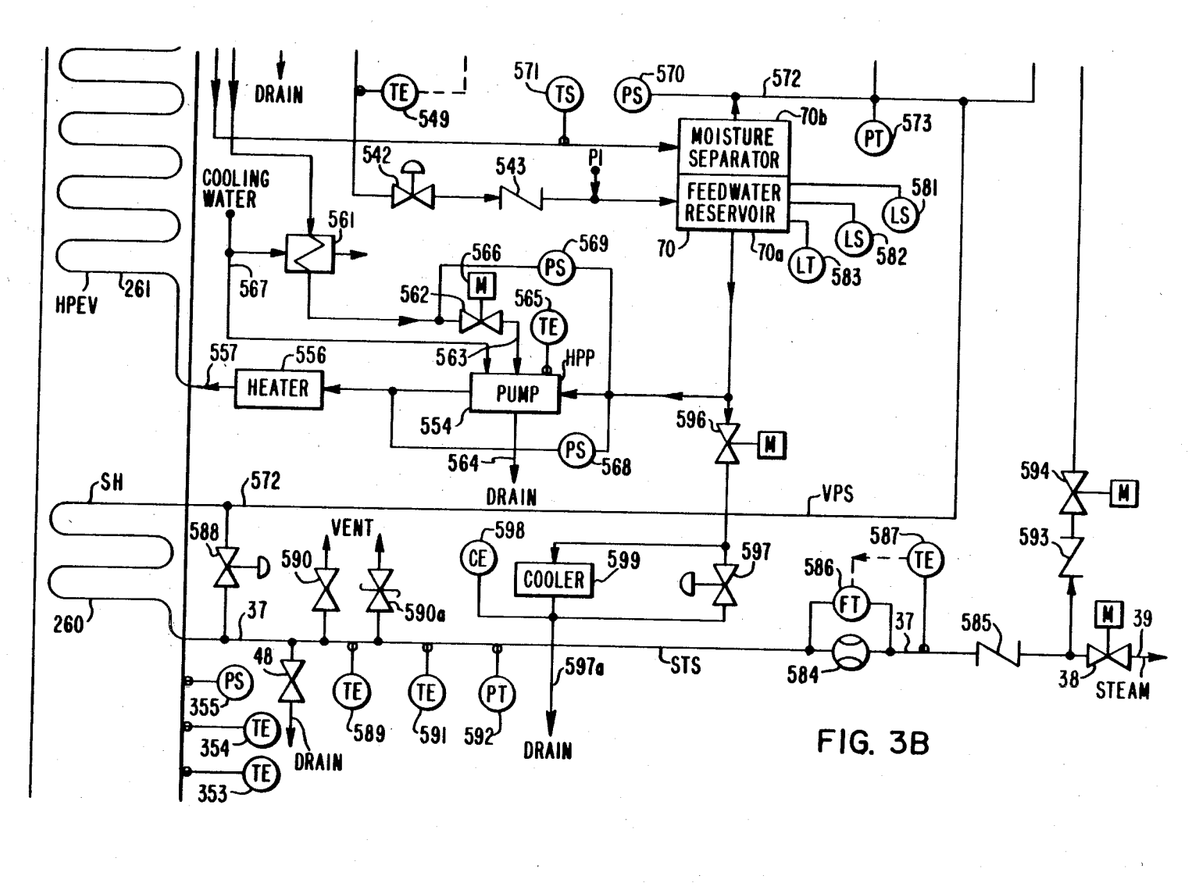

Referring to FIGS. 3A and 3B, fluid interconnections between gas turbine, steam turbine and heat recovery steam generator are represented with specific devices such as pumps, valves, flow transmitters, flow elements, temperature elements, pipes, coolers or heaters. These have been described specifically as part of the overall steam power generation system, in U.S. Pat. No. 3,965,675, for instance, which has been incorporated by reference. Relevant to the present invention are the following:

Fluid flow of condensate by line 434 via controlled valve VV1, and stop valve 502 to deaerator 68.

Extraction steam flows by line 424 via stop valve 511, valve 512 and line 513 to the deaerator vapor section 68.

Autocirculation of fluid is effected via line 504 from the low pressure storage tank 69 to the low pressure evaporator 263 (LPEV) and by line 507 to vapor section 68 of the deaerator.

Fluid flow circulation of feedwater by pumps 524, 532 (BFP in FIG. 4 thereafter) is from the low pressure storage tank 69, via line 525, stop valves 526, 533, valves 527, 534 and line 528, to the economizer 262 within the boiler. The economizer feeds by line EKL (540 in the patents) via flow element 541 (flow transmitter 548 providing an electrical signal indicative of the feedwater flow rate through flow element and the sensing temperature element 549) and feedwater control valve 542, to the feedwater reservoir 70a of the drum 70. A portion of the feedwater from line 540 is derived via recirculation control valve 546, VV2 and by line 547 to the deaerator section 68.

Pegging is effected from the moisture separator portion 70b of the drum 70, via line 572 (which otherwise goes to the superheater SH) in derivation therefrom by line 575 (PGL in FIG. 4) and via control valve VV3 to a corresponding steam inlet of deaerator section 68.

From the feedwater reservoir portion 70a of the drum DR; under suction of pump HPP steam flow goes to the high pressure evaporator HPEV by line 557.

One primary condition for pump protection is to maintain flow through the pump. With a boiler feedpump, such minimum flow corresponds to a path of water extending from the pump discharge zone to the deaerator, namely the liquid phase section or storage drum thereof, and such path includes a flow measuring element and a minimum flow block valve. A bypass circuit is associated with the pump operational path which is automatically controlled if necessary. Prior to pump start-up, such automatic bypass control system is normally open should water flow in the pump become, typically, less than 280,000 lbs/hour; the automatic bypass control will protect the pump. Bypass protection will also be provided to the pump if the temperature rise across the first section of the pump becomes too high.

Besides such external automatic "protective" feature through a bypass, the present invention provides for suction head control in the form of a suction head controller, an analog control system in the preferred implementation. Such controller determines when the minimum flow valve is opened. To this effect, two means of detection are relied upon. One is provided by flow measurement, the other is based upon the occurrence of a rise of temperature across the boiler feedpump.

According to the first means of detection, the boiler feedpump section flow is measured by a flow meter and associated transmitters. Typically, such flow transmitters are wired to a three-position switch mounted on the heat recovery steam generator secondary panel. The switch allows an operator to select between one transmitter output or the output of a high select circuit while in the automatic position.

The boiler feedpump flow signal so derived is compared with established flow setpoints by comparators which cause the minimum flow valve to open should flow drop to, typically, about 140,000 lbs/hour on one setpoint, or to close should flow exceed, typically, 315,000 lbs/hour according to the other setpoint. The value of 315,000 lbs/hour is a value selected so that when the minimum flow bypass valve is closed, the pump flow will exceed 140,000 lbs/hours minimum flow.

According to the second means of detection, a temperature rise across the feedpump is measured as an indication of flow through the feedpump. Two duplex thermocouples are typically used, which are located one at the pump inlet, the other at the outlet of the deaerator drum. These thermocouples are wired in series with a selector switch mounted on the heat recovery steam generator secondary panel to enable an operator to choose a position for high select automatically. Typically, the temperature rise across the drum outlet section is from 2° to 4° F. by design, from 5° to 7° F. at minimum flow. Should such rise reach 10° F., an alarm is set, which is reset at the level of 6° F., while tripping is triggered at the level of 12° F., typically.

The suction head controller according to the invention will open the minimum flow bypass valve, should the setpoint values be exceeded. It will trip the pump if the temperature rise across the pump exceeds normal operating values, thereby to protect the pump in the event of suction strainer blockage, of incorrect positioning of the pump suction head valve, or of maloperation of the minimum flow valve preventing proper flow through the pump.

The boiler feedpump block valve and the boiler feedpump start-up valve are automatically sequenced by the control system of the heat recovery steam generator, thereby to protect the steam generator, the piping system and the boiler feedpump.

The pump start-up block valve is automatically opened when the boiler feedpump is being started, thereby permitting controlled filling with water and pressurizing of the heat recovery steam generator. This procedure avoids jolting in the valve and piping system, while avoiding to throttle across the main block valve, since this might damage the valve or cause excessive flow in the boiler feedpump should the pump block valve be inadvertently opened too much. Once the start-up block valve is opened, it remains opened until either the boiler feedpump is stopped, or the operator closes it through the selector switch.

Once the heat recovery steam generator is filled and pressurized, the control system will open the block valve of the pump. As a result, the pump and its block valve are protected, since little flow will enter the fully pressurized heat recovery steam generator. A selector switch is provided, mounted on the primary panel of the gas turbine system for remote and manual block valve manipulation.

The boiler feedpump has a net positive suction head (NPSH-A) requirement which is a function of pump flow. This is defined as the head, or pressure, at the pump suction minus the feedwater saturation pressure corresponding to the pump inlet temperature. The HRSG controller both measures and controls (NPSH-A) as follows:

(1) In order to measure the (NPSH-A) temperature in the suction section of the pump, a duplex thermocouple is used. This duplex thermocouple is wired to a three-position selector switch which permits operator selection of either thermocouple element or the high selected value. The analog controller ANT selects the higher value between the BFP suction temperature and the L.P. storage drum temperature. The controller determines accordingly what the corresponding saturation pressure actually is. The (NPSH) requirement is determined as a function of pump flow by adding the value of the so-determined saturation pressure, the total being the required suction header pressure.

(2) The suction pressure is measured by redundant pressure transmitters. These transmitters are wired to a three-position switch at the HRSG panel which permits the operator to select either transmitter or the high selected output in the auto position. The controller compares the actual pressure with the required pressure to determine the NPSH margin. The following actions are then taken:

The pump is tripped if the NPSH margin is too low, for instance as low as 0.5 feet.

Starting of the pump is inhibited if the NPSH margin is less than 4 feet.

The pressure setpoint of the pegging steam valve is ramped up to increase the deaerator pressure and pump suction when the NPSH margin is less than 36 feet.

Cutback of condensate flow is effected to reduce deaerator energy demand and increase deaerator pressure if the pegging valve proves ineffective to increase the (NPSH-A).

(3) Maximum feedpump flow is controlled as follows:

The boiler feedwater flow demand may exceed desirable pump flow rates during certain operating conditions. The primary reason why this may occur is that a single CT HRSG may be on base load operation so that extraction steam is unavailable from the steam turbine. This causes a high energy demand in the deaerator (due to unavailability of extraction steam). It must be supplied either by the economizer recirculation flow or pegging steam extracted from the H.P. drum. The control system will give preference to economizer flow (to optimize efficiency) until the economizer flow reaches HRSG design flow. The economizer recirculation valve is then ramped closed as flow increases to the BFP design flow. This avoids pump runout while maintaining adequate pump head and H.P. drum water level and attemperator flow.

(4) Provision is made for the boiler feedpump to trip, in order to protect both the pump and the HRSG equipment.

This will occur when the economizer pressure is too high. The pump is tripped to avoid overpressure of economizer tubes, or pump damage due to low flow.

This will also occur if the economizer pressure is low and falling fast. A pump trip is then performed to protect the pump from high flow. Generally, this condition can only occur after control failure, component failure or maloperation.

It may also be that pump fluid temperature rise is excessive as the case is if lube oil pressure is low in the pump.

The same protective trip is needed if the deaerator level is very low.

It is further possible that the H.P. drum level is very high. Trip is initiated to avoid admitting additional water into the steam drum which could possibly cause a steam turbine water induction incident.

Figure 4:
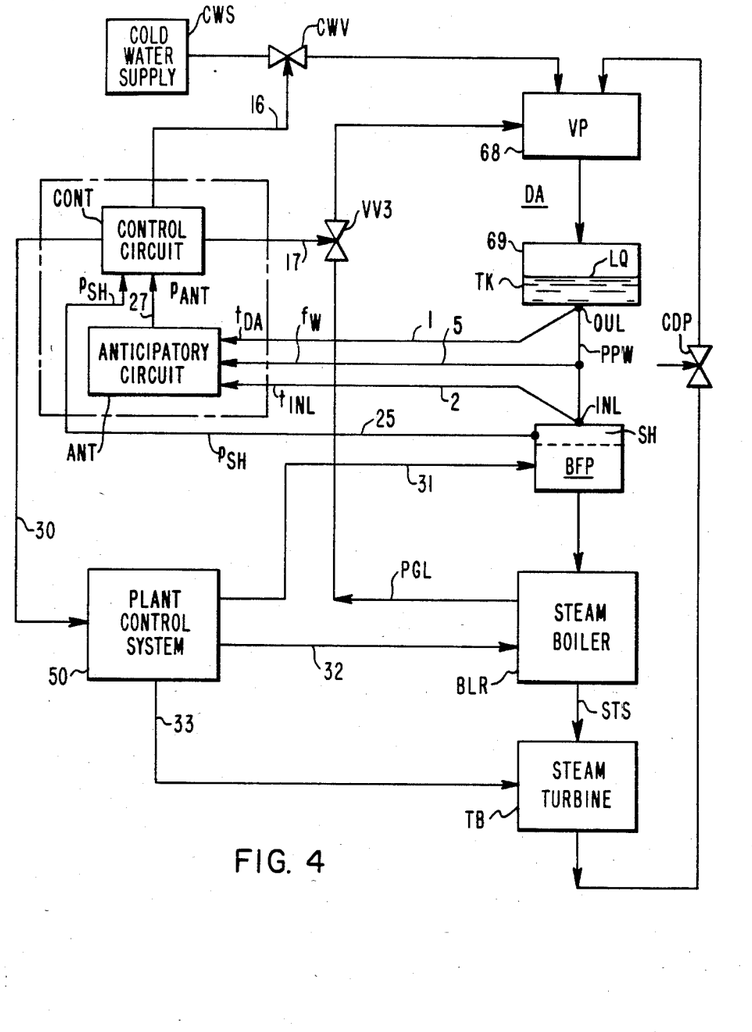
FIG. 4 is a block diagram illustrating the implementation of the suction head controller according to the invention.

FIG. 4 also represents in schematic form turbine TB. Steam is supplied to the turbine via line STS from the superheater within the boiler.

Referring to FIG. 4, controller SHC of FIG. 2 is shown to include an anticipatory circuit ANT and a control circuit CONT. The deaerator DA includes a vapor phase VP (mostly in section 68 of FIG. 2) and a liquid phase LQ (in section 69 of FIG. 2). The boiler feedpump BFP extracts degassed feedwater from the outlet OUL of the liquid phase LQ which flows through a pipe PPW leading by an inlet INL to the suction head SH of the pump. Thermocouples sense temperature $t_{DA}$ in the liquid phase at the outlet OUL and the signal is carried via line 1 to the anticipatory circuit ANT. Temperature $t_{INL}$ at the inlet INL of the feedpump is also sensed and the signal inputted via line 2 to the anticipatory circuit ANT. Water flow in pipe PPW between OUL and INL is sensed and the signal $f_W$ is inputted by line 5 to the anticipatory circuit ANT. Pressure $p_{SH}$ in the suction head SH measured by a transducer, is carried over by line 25 as an input to the control circuit CONT. The anticipatory circuit ANT, in response to the signals of lines 1, 2 and 5, generates an anticipatory signal, or desired setpoint $p_{ANT}$ on line 27. According to the size, the sign and nature of the error between lines 25 and 27, the control circuit CONT may control, by line 17 to valve VV3 of the pegging line, the amount of heat supplied to the deaerator, and therefore the pressure buildup at the outlet OUL. The control circuit CONT may also, by line 16, introduce an amount of water from a cold water supply CWS to the deaerator, thereby, drastically reducing the pressure at the outlet OUL, if necessary. The control circuit CONT may equally, by line 30, inform the plant control system 50 of a critical situation affecting the operation of the boiler feedpump, during operation, or otherwise take steps to inhibit the start of the pump. Plant control system 50 otherwise controls the operation of the system either by 32 to the boiler, by 33 to the steam turbine, as generally known.

Figure 5:
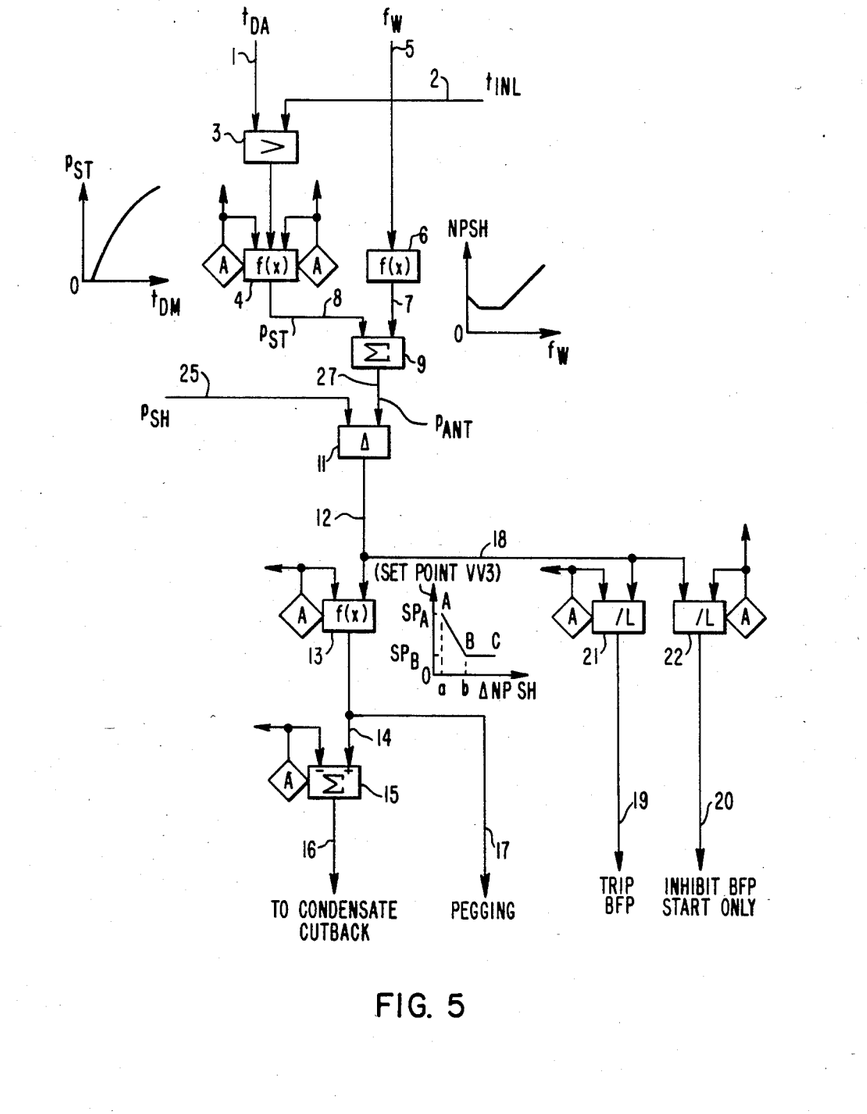
FIG. 5 is circuitry illustrating the circuitry as can be used for the controller of FIG. 4.

Referring to FIG. 5, high select circuit 3 receives, at one input from line 1, signal $t_{DA}$ representing temperature in the liquid phase of the deaerator and, at its second input from line 2, signal $t_{INL}$ representing temperature at the inlet of the pump. By choosing the larger of the two, high select circuit 3 provides at its output an indication either of the actual temperature for the suction head of the pump, e.g. the operative temperature, or the temperature at the other end of the pipe which is going to become the inlet temperature under heat flow, e.g. an anticipatory temperature. From circuit 3, the selected signal goes to a function generator 4, the output of which follows the curve (shown in FIG. 5) characterizing pressure of saturation as a function of temperature. Therefore, function generator 4 provides a signal representative of the pressure of saturation.

On line 5 a signal $f_W$, representing water flow between the deaerator and the boiler feedpump, is inputted into a function generator 6, the output of which follows a curve (shown in FIG. 5) characteristic of the pump at its suction head, namely the net positive suction head (NPSH) as a function of flow ($f_W$). This is provided by the manufacturer of the pump. Therefore, on line 7 at the output of function generator 6, a signal is derived representing NPSH, namely the amount of pressure required for the pump above saturation pressure at its inlet to properly function, whereby cavitation effects are prevented. Summer 9 provides on line 27 the sum of the signals from function generators 4 and 6, which is the desired pressure $p_{ANT}$ at the inlet of the pump. Comparator 11 compares such desired pressure, or reference signal, to actual pressure $p_{SH}$ derived on line 10, whereby an error signal $\Delta$NPSH is obtained on line 12 which is the NPSH margin.

The signal of line 12 is inputted into a third function generator 13, the output of which follows a curve (shown in FIG. 5) which ramps down from a maximum level to a predetermined level maintained constant beyond a certain level of the inputted signal $\Delta$NPSH.

Typically, the curve associated with function generator 13 on FIG. 5 establishes a ramp down AB from a NPSH margin a to a NPSH margin b at which level the ordinate or pegging valve setting is maintained at a $SP_b$ opening, as opposed to a $SP_a$ opening for the smallest margin a. Typically a=32 feet, and b=4 feet. The outputted valve setting is applied via line 17 to the pegging valve controller. The same output signal is also applied on line 14 to a summer 15 where a setpoint is subtracted, and the so derived signal is applied by line 16 to a controller of the condenser valve (VV1 on FIG. 1) to cause condensate flow cutback. This control by line 16 is effective whenever control of the pegging valve by line 17 to increase deaerator pressure as translated by feedback on line 14 has not been effective in increasing NPSH. Cutback of condensate flow results in reducing deaerator energy demand and increasing deaerator pressure.

It is observed that regulatory action can also be effected upon the valve controlling the input of heat to the deaerator from the economizer of the boiler. Another solution is to provide an auxiliary heat source and to control boiler feedpump suction head by control of such an auxiliary heat source.

The signal of line 16 is used in an extreme situation, the threshold of which is defined by the negative bias of subtractor 15. Line 16 is used to cut back the condensate supply to the deaerator, which is, indeed, a more drastic action.

From line 12, over line 18, the error signal from comparator 11 is carried over to a low select circuit 21 outputting on line 19 a control signal to trip the boiler feedpump if the error is in want of pressure, rather than an excess of pressure like beyond function generator 13. Line 18 goes also to another low select circuit 22, the outputted control signal from which is applied as a protection by line 20 to the pump controller to inhibit starting of the pump. Typically, tripping of the boiler feedpump is triggered whenever the NPSH margin is very low (typically 0.5 feet). Inhibition of the boiler feedpump start is typically caused to occur whenever the NPSH margin becomes less than 4 feet.

We claims:

1. In a steam boiler system including:
   boiler means having a deaerator comprising a vapor phase section and a liquid phase section for degassing feedwater for said boiler means;
   a boiler feedpump having an inlet and a suction head associated thereto for pumping degassed feedwater from an outlet of said liquid phase section to said boiler means, the combination of:
   means for deriving a first signal indicative of the temperature at the inlet of said feedpump;
   means for deriving a second signal indicative of the temperature at the outlet of said liquid phase section;
   means for deriving a third signal indicative of water flow from said outlet to said inlet;
   means for combining said third signal with one of said first and second signals for generating an anticipatory signal representative of the desired pressure in said suction head of said feedpump; and
   control means responsive to actual pressure in said suction head and to said anticipatory signal for controlling pressure in said suction head.

2. The system of claim 1 with said combining means including:
   high select means for selecting the larger of said first and second signals, first function generator means responsive to said high select means for providing a signal representative of pressure of saturation in relation to temperature indicative signal derived by said high select means;
   means responsive to said third signal for converting said signal into a signal representative of the net positive suction head (NPSH) characteristic of said feedpump; and
   summing means for adding said pressure of saturation representative signal and said NPSH characteristic signal to derive said anticipatory signal.

3. The system of claim 2 with said control means being operative on the supply of heat to said deaerator.

4. The system of claim 3 with said boiler means including a high pressure evaporator with a steam drum connected thereto and a superheater tubing connected to said steam drum, steam being derived from said steam drum and fed through a pegging valve to said deaerator; said control means being operative on said pegging valve.

5. The system of claim 2 with subtractor means responsive to actual pressure in said suction head and desired pressure represented by said anticipatory signal for generating a differential pressure characteristic of error; said control means including a second function generator for generating a control signal ramping from maximum control to a predetermined minimum value as a function of increasing error.

6. The system of claim 5 with said control means being operative to cut back the supply of feedwater to said deaerator when the error is maximum.

7. The system of claim 5 with said control means being operative to adjust reheat supply to said deaerator when the error is minimum.

* * * * *